United States Patent
Yang et al.

(10) Patent No.: US 12,140,255 B2
(45) Date of Patent: Nov. 12, 2024

(54) PIPE CONNECTION MECHANISM, REFRIGERATION SYSTEM HAVING THE SAME, AND REFRIGERATION APPLIANCE

(71) Applicants: QINGDAO HAIER SPECIAL REFRIGERATION ELECTRIC APPLIANCE CO., LTD., Qingdao (CN); HAIER SMART HOME CO., LTD., Qingdao (CN)

(72) Inventors: Peng Yang, Qingdao (CN); Kui Zhang, Qingdao (CN); Xiaobing Zhu, Qingdao (CN); Jianru Liu, Qingdao (CN); Jianquan Chen, Qingdao (CN); Yanbin Wan, Qingdao (CN)

(73) Assignees: QINGDAO HAIER SPECIAL REFRIGERATION ELECTRIC APPLIANCE CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 0 days.

(21) Appl. No.: 18/032,562

(22) PCT Filed: Aug. 4, 2021

(86) PCT No.: PCT/CN2021/110569
§ 371 (c)(1),
(2) Date: Apr. 18, 2023

(87) PCT Pub. No.: WO2022/083228
PCT Pub. Date: Apr. 28, 2022

(65) Prior Publication Data
US 2023/0408009 A1 Dec. 21, 2023

(30) Foreign Application Priority Data
Oct. 20, 2020 (CN) .......... 202022351804.X

(51) Int. Cl.
*F16L 33/22* (2006.01)
*F25B 41/40* (2021.01)

(52) U.S. Cl.
CPC ............ *F16L 33/225* (2013.01); *F25B 41/40* (2021.01)

(58) Field of Classification Search
CPC ....... F16L 33/225; F16L 33/226; F16L 33/22; F16L 33/20; F16L 33/207; F16L 33/2071; F16L 33/2073
See application file for complete search history.

(56) References Cited

U.S. PATENT DOCUMENTS

| 2,319,024 | A | * | 5/1943 | Wehringer | ............ | F16L 33/225 |
| | | | | | | 285/259 |
| 6,715,800 | B1 | | 4/2004 | Hennig | | |
| 2010/0276026 | A1 | * | 11/2010 | Powell | ................. | F16L 39/005 |
| | | | | | | 29/428 |

FOREIGN PATENT DOCUMENTS

| CN | 2606232 Y | 3/2004 |
| CN | 105723088 A | 6/2016 |

(Continued)

*Primary Examiner* — Aaron M Dunwoody
(74) *Attorney, Agent, or Firm* — Cheng-Ju Chiang

(57) ABSTRACT

The utility model discloses a pipe connection mechanism, a refrigeration system having the same, and a refrigeration appliance. The pipe connection mechanism is used for connecting a flexible pipe and a rigid pipe, and includes: a joint pipe and a sleeve sleeving the flexible pipe, wherein the joint pipe has a first pipe part fixedly connected to the rigid pipe, and a second pipe part forward inserted into the flexible pipe and stretching the flexible pipe in an interference manner; and the sleeve backward sleeves the second pipe part and the sleeve and the second pipe part clamp and fix the flexible pipe together. The refrigeration system (Continued)

includes a rigid pipe and a flexible pipe which are fixedly connected in a fit manner through the pipe connection mechanism.

10 Claims, 2 Drawing Sheets

(56) References Cited

FOREIGN PATENT DOCUMENTS

| | | |
|---|---|---|
| CN | 210372456 U | 4/2020 |
| CN | 210661822 U | 6/2020 |
| CN | 210687382 U | 6/2020 |
| CN | 213778258 U | 7/2021 |
| EP | 1599691 B1 | 5/2007 |
| KR | 20-2014-0003212 U | 5/2014 |
| WO | 2005/061939 A1 | 7/2005 |

* cited by examiner

PIPE CONNECTION MECHANISM, REFRIGERATION SYSTEM HAVING THE SAME, AND REFRIGERATION APPLIANCE

CROSS REFERENCE TO RELATED APPLICATIONS

The present invention is a 35 U.S.C. § 371 National Phase conversion of International (PCT) Patent Application No. PCT/CN2021/110569, filed on Aug. 4, 2021, which claims benefit of Chinese Application No. 202022351804.X, filed on Oct. 20, 2020, the disclosure of which is incorporated by reference herein. The PCT International Patent Application was filed and published in Chinese.

TECHNICAL FIELD

The utility model relates to a pipe connection mechanism, a refrigeration system having the same, and a refrigeration appliance, which belong to the field of connection technologies of flexible pipes and hard pipes.

BACKGROUND

For a refrigeration system, its good sealing performance is undoubtedly one of prerequisites for the system's quality to meet standards. However, as market rivalry pressure increases, how to improve an assembling efficiency of the refrigeration system to save time and reduce labor costs has a growing impact on the improvement of market competitiveness of products.

If a pipeline structure of the existing refrigeration system has both a rigid pipe and a flexible pipe, a connection structure is typically required to assist the connection of the rigid pipe and the flexible pipe. However, the existing connection structure between the flexible pipe and the rigid pipe is often simple in assembling but difficult to ensure the sealing performance, or the structure is too complex, resulting in a low assembling efficiency and complicated operation. As a result, it is difficult to balance the assembling efficiency and the sealing performance.

SUMMARY

An object of the utility model is to provide a pipe connection mechanism to solve the problem in the prior art that it is difficult to balance the assembling efficiency and the sealing performance during connection of a flexible pipe and a rigid pipe.

Another object of the utility model is to provide a refrigeration system having the pipe connection mechanism.

Another object of the utility model is to provide a refrigeration appliance having the refrigeration system.

In order to achieve the above objects, an embodiment of the utility model provides a pipe connection mechanism for connecting a flexible pipe and a rigid pipe, including:
- a joint pipe having a first pipe part and a second pipe part which are disposed at two opposite ends of the joint pipe, respectively, wherein the first pipe part is fixedly connected to the rigid pipe, and the second pipe part is forward inserted into the flexible pipe and stretches the flexible pipe in an interference manner; and
- a sleeve sleeving the flexible pipe, wherein the sleeve backward sleeves the second pipe part, and the sleeve and the second pipe part clamp and fix the flexible pipe together.

As a further improvement of an embodiment of the utility model, the first pipe part is connected to the rigid pipe in a welding manner, or the joint pipe and the rigid pipe are integrally formed.

As a further improvement of an embodiment of the utility model, a difference value between an inner radius of the sleeve and an outer radius of the second pipe part is less than a pipe wall thickness of the flexible pipe.

As a further improvement of an embodiment of the utility model, an anti-slip structure configured as a protrusion or a groove is arranged on an outer surface of the second pipe part.

As a further improvement of an embodiment of the utility model, the anti-slip structure extends around an axis of the second pipe part to form a ring shape.

As a further improvement of an embodiment of the utility model, the joint pipe has a limiting boss protruding outward from the second pipe part, and the limiting boss is capable of abutting against a rear end surface of the sleeve to define a limit position of backward movement of the sleeve.

As a further improvement of an embodiment of the utility model, the limiting boss extends around the axis of the second pipe part to form a ring-shaped boss.

As a further improvement of an embodiment of the utility model, an outer diameter of a front end pipe part of the sleeve is less than an outer diameter of a rear end pipe part of the sleeve, so that an outer surface of the sleeve is step-shaped; and the joint pipe has a limiting boss protruding outward from the first pipe part, and an outer surface of the limiting boss and an outer surface of the first pipe part are connected to be step-shaped.

As a further improvement of an embodiment of the utility model, the sleeve and the joint pipe are disposed as integrally formed metal members, respectively.

Compared with the prior art, the utility model has the following beneficial effects.

By using the second pipe part to support the flexible pipe in an interference manner and in combination with external close press against the flexible pipe through the sleeve, the pipe connection mechanism ensures the sealing performance between the flexible pipe and the second pipe part, so as to prevent fluid in the flexible pipe and the rigid pipe from leaking outward along a gap between the flexible pipe and the second pipe part.

Meanwhile, the connection between the flexible pipe and the rigid pipe can be quickly realized through an insertion operation between the sleeve and the joint pipe and the flexible pipe; and the operation is simple and convenient, the assembling efficiency is high, and the two aspects of assembling efficiency and sealing performance are both considered.

In order to achieve the above objects, an embodiment of the utility model provides a refrigeration system, including a rigid pipe and a flexible pipe which allow a refrigerant to flow, and further including a pipe connection mechanism, wherein the rigid pipe and the flexible pipe are fixedly connected in a fit manner through the pipe connection mechanism; and
the pipe connection mechanism includes:
a joint pipe having a first pipe part and a second pipe part which are disposed at two opposite ends of the joint pipe, respectively, wherein the first pipe part is fixedly connected to the rigid pipe, and the second pipe part is forward inserted into the flexible pipe and stretches the flexible pipe in an interference manner; and a sleeve sleeving the flexible pipe, wherein the sleeve backward sleeves the second pipe part, and the sleeve and the second pipe part clamp and fix the flexible pipe together.

As a further improvement of an embodiment of the utility model, the first pipe part is connected to the rigid pipe in a welding manner, or the joint pipe and the rigid pipe are integrally formed.

As a further improvement of an embodiment of the utility model, a difference value between an inner radius of the sleeve and an outer radius of the second pipe part is less than a pipe wall thickness of the flexible pipe.

As a further improvement of an embodiment of the utility model, an anti-slip structure configured as a protrusion or a groove is arranged on an outer surface of the second pipe part.

As a further improvement of an embodiment of the utility model, the anti-slip structure extends around an axis of the second pipe part to form a ring shape.

As a further improvement of an embodiment of the utility model, the joint pipe has a limiting boss protruding outward from the second pipe part, and the limiting boss is capable of abutting against a rear end surface of the sleeve to define a limit position of backward movement of the sleeve.

As a further improvement of an embodiment of the utility model, the limiting boss extends around the axis of the second pipe part to form a ring-shaped boss.

As a further improvement of an embodiment of the utility model, an outer diameter of a front end pipe part of the sleeve is less than an outer diameter of a rear end pipe part of the sleeve, so that an outer surface of the sleeve is step-shaped; and the joint pipe has a limiting boss protruding outward from the first pipe part, and an outer surface of the limiting boss and an outer surface of the first pipe part are connected to be step-shaped.

As a further improvement of an embodiment of the utility model, the sleeve and the joint pipe are disposed as integrally formed metal members, respectively.

Compared with the prior art, the utility model has the following beneficial effects.

The refrigeration system adopts the pipe connection mechanism, and by using the second pipe part to support the flexible pipe in an interference manner and in combination with external close press against the flexible pipe through the sleeve, the sealing performance between the flexible pipe and the second pipe part is ensured, and the refrigerant in the flexible pipe and the second pipe part is prevented from leaking along a gap between the flexible pipe and the second pipe part.

Meanwhile, the connection between the flexible pipe and the rigid pipe can be quickly realized through an insertion operation between the sleeve and the joint pipe and the flexible pipe; and the operation is simple and convenient, the assembling efficiency is high, and the two aspects of assembling efficiency and sealing performance are both considered.

In order to achieve the above objects, an embodiment of the utility model provides a refrigeration appliance, including a refrigeration system. The refrigeration system includes a rigid pipe and a flexible pipe which allow a refrigerant to flow, and further includes a pipe connection mechanism, wherein the rigid pipe and the flexible pipe are fixedly connected in a fit manner through the pipe connection mechanism; and the pipe connection mechanism includes:

a joint pipe having a first pipe part and a second pipe part which are disposed at two opposite ends of the joint pipe, respectively, wherein the first pipe part is fixedly connected to the rigid pipe, and the second pipe part is forward inserted into the flexible pipe and stretches the flexible pipe in an interference manner; and a sleeve sleeving the flexible pipe, wherein the sleeve backward sleeves the second pipe part, and the sleeve and the second pipe part clamp and fix the flexible pipe together.

As a further improvement of an embodiment of the utility model, the first pipe part is connected to the rigid pipe in a welding manner, or the joint pipe and the rigid pipe are integrally formed.

As a further improvement of an embodiment of the utility model, a difference value between an inner radius of the sleeve and an outer radius of the second pipe part is less than a pipe wall thickness of the flexible pipe.

As a further improvement of an embodiment of the utility model, an anti-slip structure configured as a protrusion or a groove is arranged on an outer surface of the second pipe part.

As a further improvement of an embodiment of the utility model, the anti-slip structure extends around an axis of the second pipe part to form a ring shape.

As a further improvement of an embodiment of the utility model, the joint pipe has a limiting boss protruding outward from the second pipe part, and the limiting boss is capable of abutting against a rear end surface of the sleeve to define a limit position of backward movement of the sleeve.

As a further improvement of an embodiment of the utility model, the limiting boss extends around the axis of the second pipe part to form a ring-shaped boss.

As a further improvement of an embodiment of the utility model, an outer diameter of a front end pipe part of the sleeve is less than an outer diameter of a rear end pipe part of the sleeve, so that an outer surface of the sleeve is step-shaped; and the joint pipe has a limiting boss protruding outward from the first pipe part, and an outer surface of the limiting boss and an outer surface of the first pipe part are connected to be step-shaped.

As a further improvement of an embodiment of the utility model, the sleeve and the joint pipe are disposed as integrally formed metal members, respectively.

Compared with the prior art, the utility model has the following beneficial effects.

The refrigeration system of the refrigeration appliance adopts the pipe connection mechanism, and by using the second pipe part to support the flexible pipe in an interference manner and in combination with external close press against the flexible pipe through the sleeve, the sealing performance between the flexible pipe and the second pipe part is ensured, and the refrigerant is prevented from leaking along a gap between the flexible pipe and the second pipe part.

Meanwhile, the connection between the flexible pipe and the rigid pipe can be quickly realized through an insertion operation between the sleeve and the joint pipe and the flexible pipe; the operation is simple and convenient, the assembling efficiency is high, and the two aspects of assembling efficiency and sealing performance are both considered; and the quality of the refrigeration appliance is greatly improved and the manufacturing cost of the refrigeration appliance is reduced.

DETAILED DESCRIPTION

The utility model will be described in detail in combination with specific embodiments shown in the accompanying drawings. However, these embodiments do not limit the utility model, and the structure, method or function changes made by those ordinary skilled in the art according to these embodiments are embraced in the protection scope of the utility model.

Figure 1:
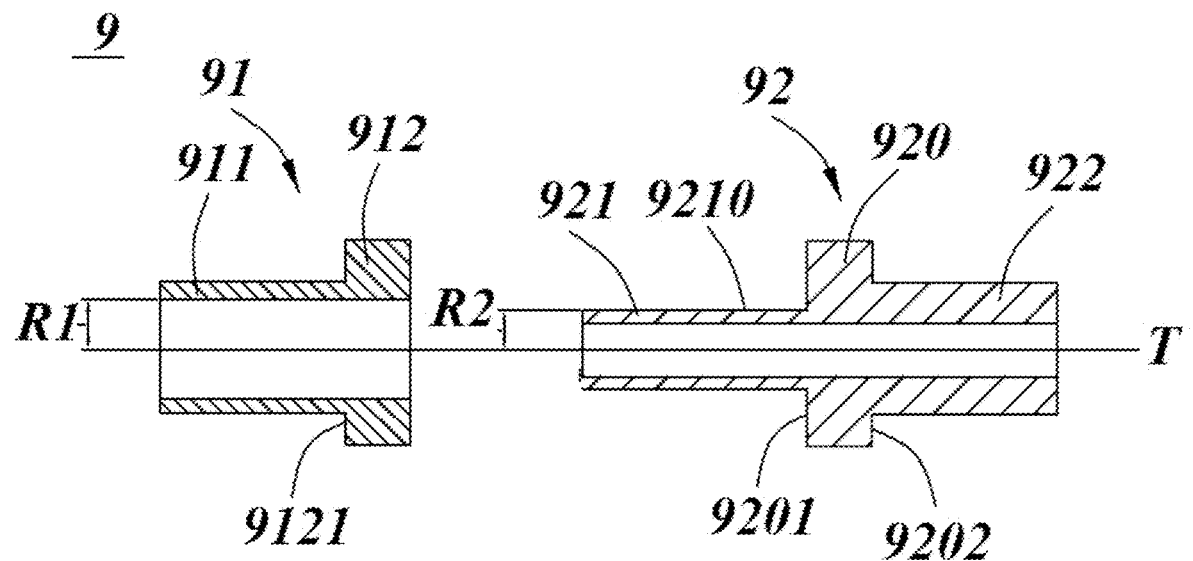
FIG. 1 is a schematic structural exploded cross-sectional view of a pipe connection mechanism according to an embodiment of the utility model.
Figure 2:
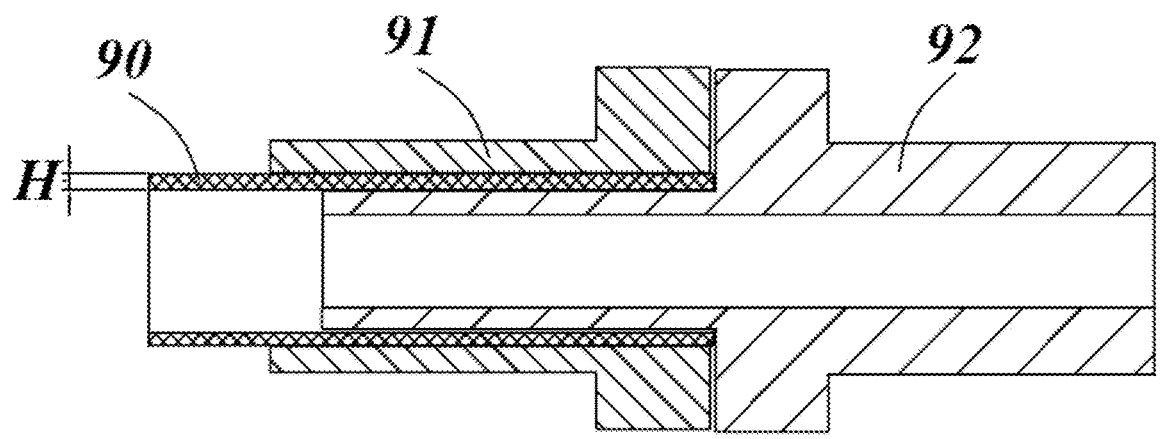
FIG. 2 is a schematic structural cross-sectional view of cooperation between a pipe connection mechanism and a flexible pipe according to an embodiment of the utility model.
Figure 3:
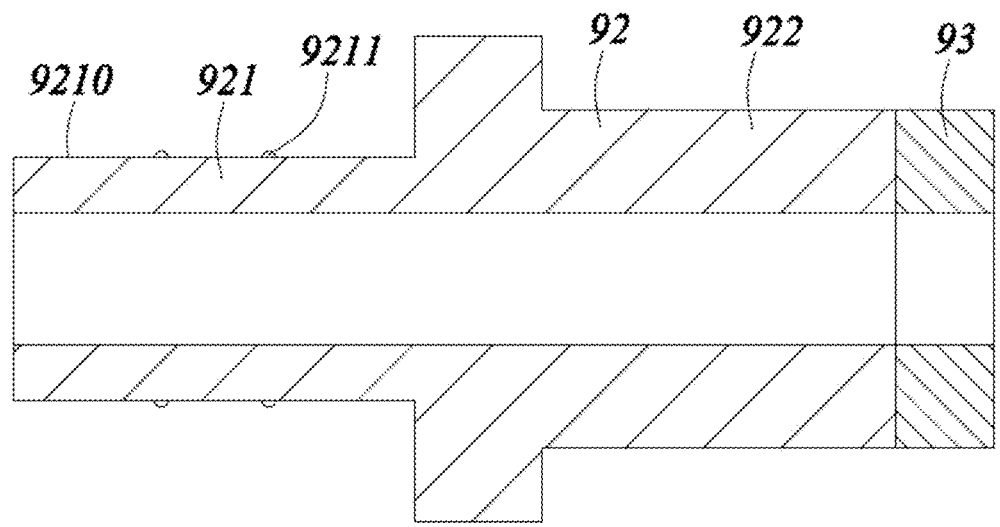
FIG. 3 is a schematic structural cross-sectional view of a joint pipe and a rigid pipe according to an embodiment of the utility model.

Referring to FIGS. 1 to 3, a pipe connection mechanism 9 according to an embodiment of the utility model is illustrated, and is used for connecting a flexible pipe to a rigid pipe 93.

In the present embodiment, an application of the pipe connection mechanism 9 is provided, and specifically, the pipe connection mechanism 9 is applied to a refrigeration system. Of course, it can be understood that the application of the pipe connection mechanism 9 is not limited thereto, and the pipe connection mechanism 9 may also be applied to other flexible pipe and rigid pipe 93 connection scenarios except the refrigeration system.

In the present embodiment, a refrigeration system is provided, the refrigeration system includes a flexible pipe 90, the rigid pipe 93 and the pipe connection mechanism 9. The flexible pipe 90 and the rigid pipe 93 may be both used for allowing a refrigerant of the refrigeration system to flow, and are fixedly connected in a fit manner through the pipe connection mechanism 9, so that the refrigerant can smoothly flow from the flexible pipe 90 into the rigid pipe 93 or from the rigid pipe 93 into the flexible pipe 90.

The flexible pipe 90 and the rigid pipe 93 are assembled and connected by the pipe connection mechanism 9 according to the present embodiment, not only is the assembling quick and convenient, but also better sealing performance can be ensured. Thus, both the assembling efficiency and the sealing performance can be taken into consideration.

Specifically, the pipe connection mechanism 9 includes a joint pipe 92 and a sleeve 91.

The joint pipe 92 has a first pipe part 922 and a second pipe part 921 which are disposed at two opposite ends, respectively. In the schematic drawings, the joint pipe 92 is disposed as a straight pipe with the extending front and rear. In detail, the first pipe part 922 is formed at the rear end of the joint pipe 92, and the second pipe part 921 is formed at the front end of the joint pipe 92.

The first pipe part 922 is fixedly connected to the rigid pipe 93, the second pipe part 921 is inserted into the flexible pipe 90 from back to front, and the second pipe part 921 stretches the flexible pipe 90 in an interference manner.

The sleeve 91 sleeves the flexible pipe 90, moves towards the joint pipe 92 from front to back, and sleeves the second pipe part 921. In this way, the sleeve 91 and the second pipe part 921 can clamp and fix the flexible pipe 90 together, that is, the second pipe part 921 supports the flexible pipe 90 in an interference manner from the inner side of the flexible pipe 90. At the same time, the sleeve 91 presses the flexible pipe 90 inward from the outer side of the flexible pipe 90, so that the flexible pipe 90 is tightly clamped and fixed between the sleeve 91 and the second pipe part 921.

Therefore, by using the second pipe part 921 to support the flexible pipe 90 in an interference manner and in combination with external close press against the flexible pipe 90 through the sleeve 91, the pipe connection mechanism 9 ensures the sealing performance between the flexible pipe 90 and the second pipe part 921, so as to prevent the refrigerant from leaking along a gap between the flexible pipe 90 and the second pipe part 921. Meanwhile, the connection between the flexible pipe 90 and the rigid pipe 93 can be quickly realized through an insertion operation between the sleeve 91 and the joint pipe 92 and the flexible pipe 90, no other additional structural members are required (that is, the pipe connection mechanism 9 can be formed only by the sleeve 91 and the joint pipe 92). The structure is simple, the operation is simple and convenient, the assembling efficiency is high, and the two aspects of assembling efficiency and sealing performance are both considered.

Further, the first pipe part 922 may be specifically connected to the rigid pipe 93 by means of welding. Of course, in a variant embodiment, the joint pipe 92 may also be integrally formed with the rigid pipe 93, that is, the joint pipe 92 is directly machined and formed at the tail end of the rigid pipe 93.

Preferably, the cross-section of an outer surface 9210 of the second pipe part 921 is set to be circular, and correspondingly, an inner cavity of the sleeve 91 is set to be circular, that is, the cross-section of the inner surface of the sleeve 91 is circular, so that the fitting can be facilitated, and the flexible pipe 90 is prevented from being cut at a sharp angle.

Further, an inner radius R1 of the sleeve 91 is greater than an outer radius R2 of the second pipe part 921, and the difference value (R1−R2) between the inner radius R1 of the sleeve 91 and the outer radius R2 of the second pipe part 921 is less than a pipe wall thickness H of the flexible pipe 90, so that it can be ensured that the flexible pipe 90 is further clamped by the sleeve 91 and the second pipe part 921.

In addition, referring to FIG. 3, in the present embodiment, an anti-slip structure 9211 is arranged on the outer surface 9210 of the second pipe part 921, and the anti-slip structure 9211 increases firmness of the flexible pipe 90 on the second pipe part 921 when the second pipe part 921 supports the flexible pipe 90 in an interference manner, which can prevent the flexible pipe 90 from being separated from the second pipe part 921. Meanwhile, the difficulty that the refrigerant leaks between the flexible pipe 90 and the second pipe part 921 is increased, such that the sealing effect is ensured.

The anti-slip structure 9211 is configured as a protrusion protruding outward from the outer surface 9210 of the second pipe part 921 or a groove recessed inward in the outer surface 9210 of the second pipe part 921.

Preferably, the anti-slip structure 9211 extends around an axis T of the second pipe part 921 to form a ring shape, so that the sealing effect can be further improved and the fitting firmness can be enhanced. Of course, the shape of the anti-slip structure 9211 is not limited thereto, for example, the anti-slip structure 9211 may also be disposed in a shape of a grid or the like.

Further, the joint pipe 92 has a limiting boss 920 protruding outward from the second pipe part 921, that is, the outer surface of the limiting boss 920 is disposed away from the axis T relative to the outer surface 9210 of the second pipe part 921. A front end surface 9201 of the limiting boss 920 can abut against a rear end surface of the sleeve 91, thereby defining a limit position of backward movement of the sleeve 91.

In this way, during assembling of the flexible pipe 90 and the rigid pipe 93, the assembling can be completed when the rear end surface of the sleeve 91 abuts against the front end surface 9201 of the limiting boss 920, so that it is convenient for an operator to judge whether the assembling is in place in time and avoid blind over-assembling. Meanwhile, it is convenient to accurately control the length of a flow path of the refrigerant in the flexible pipe 90 in the refrigeration system.

Preferably, the limiting boss 920 extends around the axis T of the second pipe part 921 to form a ring-shaped boss, that is, the limiting boss 920 circumferentially surrounds the axis T by one circle. In this way, when the flexible pipe 90 and the rigid pipe 93 are completely assembled through the pipe connection mechanism 9, the front end surface 9201 of the limiting boss 920 can abut against the rear end surface of the sleeve 91 in the circumferential direction, thereby further lengthening the path through which the refrigerant leaks from the pipe connection mechanism 9, and improving the sealing effect.

In this case, it should be added and explained that in FIG. 2, in order to clearly show the structure of each component, every two surfaces which should be attached (such as the outer surface 9210 of the second pipe part 921 and the inner surface of the flexible pipe 90, the outer surface of the flexible pipe 90 and the inner surface of the sleeve 91, and the front end surface 9201 of the limiting boss 920 and the rear end surface of the sleeve 91) are spaced apart by a certain gap, which does not form a limitation to the technical solution. It should be understood that in actual implementation, these two surfaces which are attached to each other are in close contact without gaps.

Further, the outer diameter of a front end pipe part 911 of the sleeve 91 is less than the outer diameter of a rear end pipe part 912 of the sleeve 91, so that the outer surface of the sleeve 91 is step-shaped, that is, the front end pipe part 911 is relatively thin and the rear end pipe part 912 is relatively thick. The outer surface of the front end pipe part 911 and the outer surface of the rear end pipe part 912 are connected by a surface 9121. In other words, the surface 9121 may be regarded as the front end surface of the rear end pipe part 912. In this way, by disposing the structure which is thin at the front and thick at the rear, when the sleeve 91 sleeves the second pipe part 921, a pushing force can be applied by pushing the surface 9121 from the front, so that the sleeve 91 can be pressed against the limiting boss 920, that is, the force applying in a mounting process is convenient.

Similarly, the limiting boss 920 also protrudes outward from the first pipe part 922, that is, the outer surface of the limiting boss 920 is disposed away from the axis T relative to the outer surface of the first pipe part 922. The outer surface of the limiting boss 920 and the outer surface of the first pipe part 922 are connected through a surface 9202 to form a stepped shape. In other words, the surface 9202 may be regarded as the rear end surface of the limiting boss 920. In this way, when the sleeve 91 sleeves the second pipe part 921, a pushing force can be applied by pushing the surface 9202 from the rear, so that the sleeve 91 can be pressed against the limiting boss 920, that is, the force applying in a mounting process is convenient.

Further, the sleeve 91 is disposed as an integrally formed metal member, the joint pipe 92 is also disposed as an integrally formed metal member, and the sleeve 91 and the joint pipe 92 may be both made of copper or other materials.

Further, an embodiment of the utility model also provides an application of the refrigeration system, and specifically provides a refrigeration appliance. The refrigeration appliance also includes the refrigeration system as mentioned above. Of course, it can be understood that the embodiment is only an application scenario of the refrigeration system, and the refrigeration system may also be applied to other refrigeration electric appliances except the refrigeration appliance.

In summary, the utility model has the following beneficial effects.

By using the second pipe part 921 to support the flexible pipe 90 in an interference manner and in combination with external close press against the flexible pipe 90 through the sleeve 91, the pipe connection mechanism 9 ensures the sealing performance between the flexible pipe 90 and the second pipe part 921, so as to prevent the refrigerant from leaking along a gap between the flexible pipe 90 and the second pipe part 921.

Meanwhile, the connection between the flexible pipe 90 and the rigid pipe 93 can be quickly realized through an insertion operation between the sleeve 91 and the joint pipe 92 and the flexible pipe 90; and the operation is simple and convenient, the assembling efficiency is high, and the two aspects of assembling efficiency and sealing performance are both considered.

The anti-slip structure 9211 is arranged on the outer surface 9210 of the second pipe part 921, which increases the firmness of the flexible pipe 90 on the second pipe part 921, and can prevent the flexible pipe 90 from being separated from the second pipe part 921. Meanwhile, the difficulty that the refrigerant leaks between the flexible pipe 90 and the second pipe part 921 is increased, such that the sealing effect is further improved.

By disposing the limiting boss 920, during assembling of the hose flexible pipe 90 and the rigid pipe 93, it is convenient for an operator to judge whether the assembling is in place in time and avoid blind over-assembling. Meanwhile, it is convenient to accurately control the length of a flow path of the refrigerant in the flexible pipe 90 in the refrigeration system.

It should be understood that although the Description is described in terms of the embodiments, not every embodiment merely includes one independent technical solution. The explanation mode of the Description is merely for the sake of clarity, and those skilled in the art should regard the Description as a whole. The technical solutions in respective embodiments may also be combined as appropriate to form other embodiments that can be understood by those skilled in the art.

The detailed descriptions set forth above are merely specific illustrations of feasible embodiments of the utility model, and are not intended to limit the scope of protection of the utility model. All equivalent embodiments or modifications that do not depart from the technical spirit of the utility model should fall within the scope of protection of the utility model.

What is claimed is:

1. A pipe connection mechanism for connecting a flexible pipe and a rigid pipe, comprising:
   a joint pipe having a first pipe part and a second pipe part which are disposed at two opposite ends of the joint pipe, respectively, wherein the first pipe part is fixedly connected to the rigid pipe, and the second pipe part is forward inserted into the flexible pipe and stretches the flexible pipe in an interference manner; and a sleeve sleeving the flexible pipe, wherein the sleeve backward sleeves the second pipe part, and the sleeve and the second pipe part clamp and fix the flexible pipe together;

wherein an outer diameter of a front end pipe part of the sleeve is less than an outer diameter of a rear end pipe part of the sleeve, so that an outer surface of the sleeve is step-shaped; and the joint pipe has a limiting boss protruding outward from the first pipe part, and an outer surface of the limiting boss and an outer surface of the first pipe part are connected to be step-shaped.

2. The pipe connection mechanism according to claim 1, wherein the first pipe part is connected to the rigid pipe in a welding manner, or the joint pipe and the rigid pipe are integrally formed.

3. The pipe connection mechanism according to claim 1, wherein a difference value between an inner radius of the sleeve and an outer radius of the second pipe part is less than a pipe wall thickness of the flexible pipe.

4. The pipe connection mechanism according to claim 1, wherein an anti-slip structure configured as a protrusion or a groove is arranged on an outer surface of the second pipe part.

5. The pipe connection mechanism according to claim 4, wherein the anti-slip structure extends around an axis of the second pipe part to form a ring shape.

6. The pipe connection mechanism according to claim 1, wherein the joint pipe has a limiting boss protruding outward from the second pipe part, and the limiting boss is capable of abutting against a rear end surface of the sleeve to define a limit position of backward movement of the sleeve.

7. The pipe connection mechanism according to claim 6, wherein the limiting boss extends around the axis of the second pipe part to form a ring-shaped boss.

8. The pipe connection mechanism according to claim 1, wherein the sleeve and the joint pipe are disposed as integrally formed metal members, respectively.

9. A refrigeration system, comprising a rigid pipe and a flexible pipe which allow a refrigerant to flow, and further comprising the pipe connection mechanism according to claim 1, wherein the rigid pipe and the flexible pipe are fixedly connected in a fit manner through the pipe connection mechanism.

10. A refrigeration appliance, comprising the refrigeration system according to claim 9.

* * * * *